April 7, 1953 — C. F. LAUENSTEIN ET AL — 2,633,743

TENSIOMETER

Filed June 1, 1951 — 2 SHEETS—SHEET 1

INVENTORS
Carl F. Lauenstein and
Ivan E. Rhoden
BY
ATTORNEY

April 7, 1953  C. F. LAUENSTEIN ET AL  2,633,743
TENSIOMETER
Filed June 1, 1951  2 SHEETS—SHEET 2
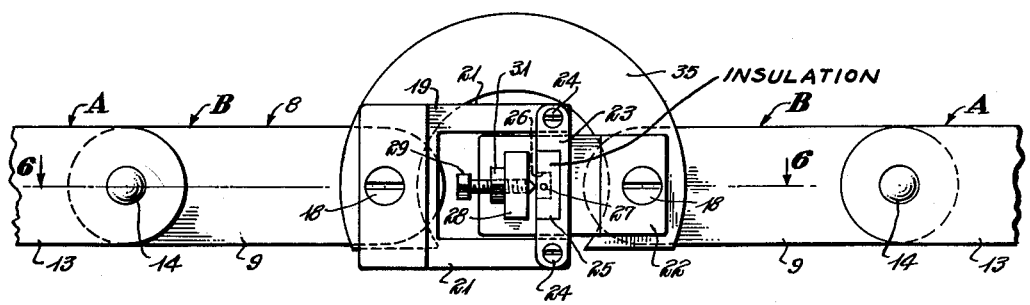
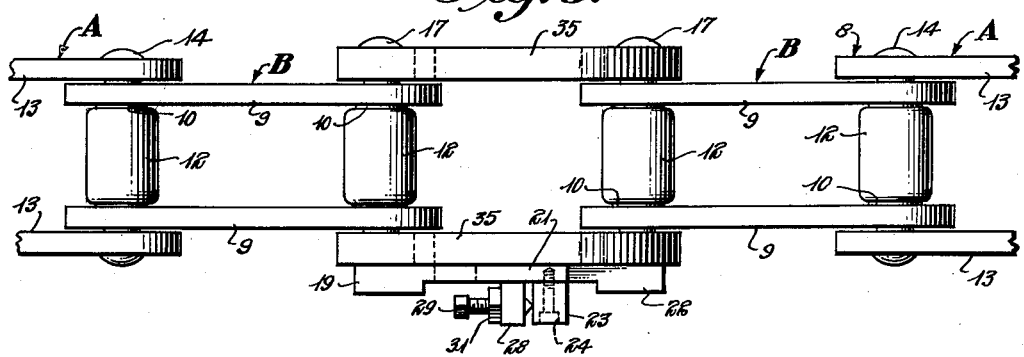
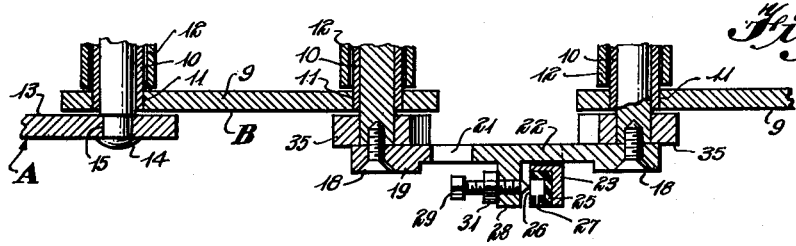
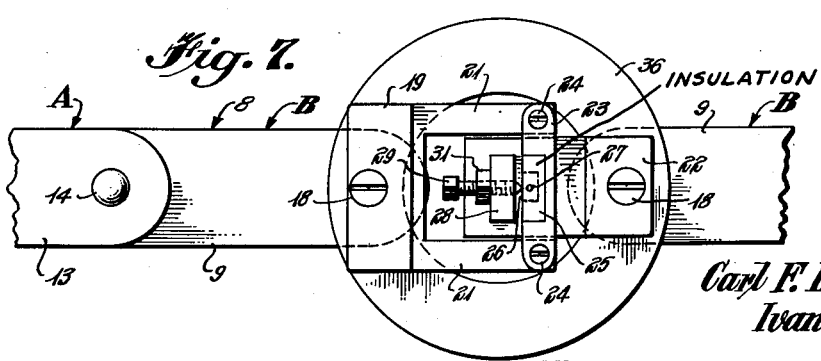
INVENTORS
Carl F. Lauenstein and
Ivan E. Rhoden
BY
ATTORNEY Patented Apr. 7, 1953

2,633,743

UNITED STATES PATENT OFFICE 2,633,743

TENSIOMETER

Carl F. Lauenstein and Ivan E. Rhoden, Indianapolis, Ind., assignors to Link-Belt Company, a corporation of Illinois Application June 1, 1951, Serial No. 229,336

12 Claims. (Cl. 73—143)

This invention relates to new and useful improvements in tensiometers for determining the maximum load applied to a chain subjected to a given set of operating conditions.

To determine the proper type and size of chain that is best suited for a particular application, it is necessary to know the maximum load which the chain must withstand. These chain loads for any given installation, of course, will vary through a considerable range due to changes in the loading of the driven device, or its speed of operation. Occasionally, shock or impact loading will materially affect the selection of the proper chain.

In the past, mathematical calculations, modified by experience and a substantial factor of safety, have been relied upon in determining which chain would be best suited for a particular application. This empirical process was at best an approximation and has generally resulted in the selection of a larger chain than necessary. Further, since the presumed chain load has been only approximate, it has been impossible to accurately predict the life of the chain even with the most reliable fatigue curve data.

Accurate knowledge of the precise peak load encountered by a normally loaded operating chain, on the other hand, would permit selection of a chain having the exact characteristics required. Such knowledge also would make it possible to predict, with the aid of ordinary fatigue curve data, the life of a chain operating under any given conditions.

As the maximum operating load applied to a chain is directly proportional to the maximum elongation that will occur in the chain, a measurement of the latter will provide a basis for accurately determining the maximum operating load.

It is the primary object of this invention to provide a tensiometer which will provide a recorded measurement of the maximum elongation that will occur in a chain during its operation.

A further object of the invention is to provide a tensiometer which may be substituted for one of the links of a chain for measuring and recording the maximum elongation of that link during a given period of operation whereby the directly proportional maximum operating load applied to the chain may be readily determined.

Other objects and advantages of the invention will be apparent during the course of the following description.

Figure 1:
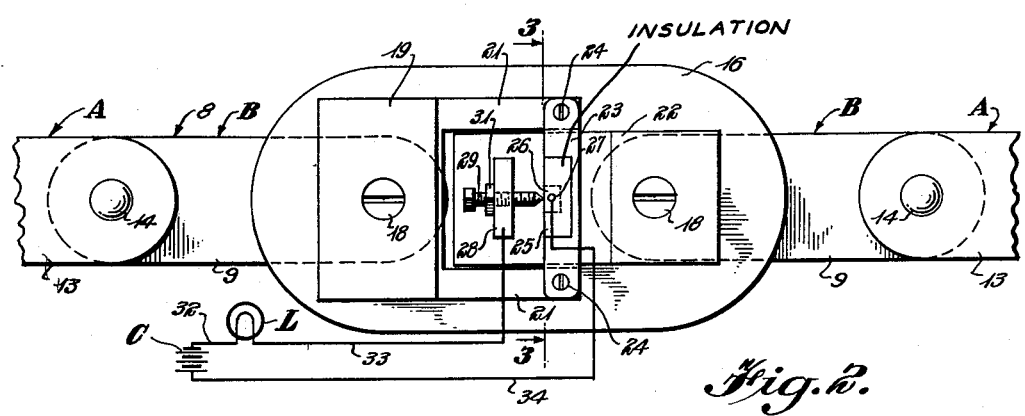
Figure 2:
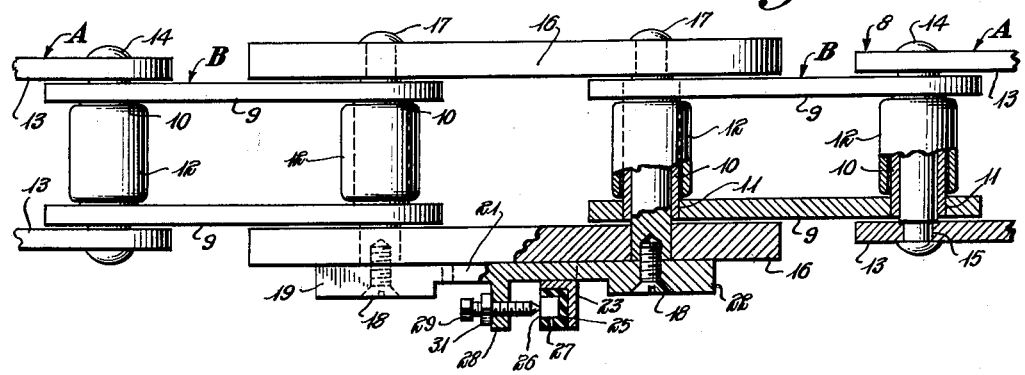
Figure 3:
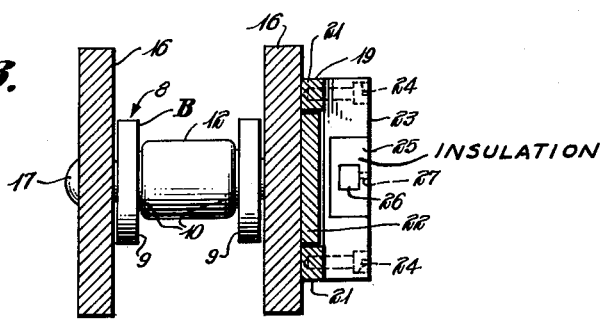

In the accompanying drawings forming a part of this specification and in which like reference characters are employed to designate like parts throughout the same, Figure 1 is a side elevational view of a tensiometer device embodying this invention operatively associated with a chain, Figure 2 is a top plan view, partly broken away, of the device illustrated in Fig. 1, Figure 3 is a vertical sectional view taken on line 3—9 of Fig. 1, Figure 4 is a side elevational view of a tensiometer device embodying a modified form of the invention operatively associated with a chain, Figure 5 is a top plan view of the device illustrated in Fig. 4, Figure 6 is a sectional view taken on line 6—6 of Fig. 4, and Figure 7 is a side elevational view of a tensiometer device embodying a still further modification of the invention operatively associated with a chain.

In the drawings, wherein for the purpose of illustration are shown the preferred embodiments of this invention, and first particularly referring to Figs. 1 to 3, inclusive, there is shown a length of chain 8 formed of alternate outside and inside links A and B. Each inside link B is made up of a pair of side plates 9 connected at their corresponding end portions by bushings 10 which are press fitted into openings 11 formed in the plates. The bushings 10 have mounted thereon the conventional sprocket teeth engaging rollers 12.

Each outside link A of the chain is formed of a pair of side plates 13 which are connected at their corresponding end portions by pins 14 that pass through the bushings 10 of the overlapped end portions of the inside links. The pins 14 have their end portions swaged to maintain the side bars in their properly spaced relationship.

A single standard outside link A of the chain is replaced by a pair of special side plates 16 which are connected to adjacent inside links B by the pins 17. These special side plates 16 are of standard oval side plate shape and are made of aluminum, or any other suitable material having a low modulus of elasticity, so that a magnified amount of elongation will occur under any given tensile load that is applied to the chain 8. It will be understood that the cross-sectional area of the special side plates 17 and the material from which they are made may be varied to produce any desired elongation under a given chain load.

One end of each of the pins 17 terminates at the plane of the outer face of one of the special side plates while the other end is swaged. That end which terminates at the outer face of the special side plate is drilled and tapped to accommodate set screws 18.

A block 19 is rigidly connected to the end of one of the pins 17 by a set screw 18 and extends along the outer face of the adjacent special side plate 16 toward the other pin 17. The free end portion of the block 19 is cut out to form the two spaced bracket arms 21.

A second block 22 is similarly connected to the end of the pin 17 toward which the block 19 extends and the free end portion of the block 22 projects into the space between the bracket arms 21. The free end portion of the block 22 is thereby arranged in longitudinally overlapped relationship with the end portions of the bracket arms 21 so that opposite movements of the pins 17 will effect opposite movements of the said overlapped free end portions. The bracket arms 21 serve to guide the block 22.

A bridge 23 is mounted between the ends of the bracket arms 21 by set screws 24 so as to overlie the block 22. Removably mounted near the center of the bridge 23 is a block of Bakelite, or similar material 25, which has centrally positioned in one side thereof a small plug of lead, Wood's metal or other penetrable material. The Bakelite block 25 has a hole 27 formed therein for the insertion of a lead wire to make contact with the metal plug 26.

Mounted on the free end portion of the block 22 is a lug 28 having a tapped hole therethrough for receiving an adjustable penetrator 29. The pointed end of the penetrator 29 extends toward the plug 26 and is adjusted, while the chain to be tested is not in motion, so that the point barely touches the plug. A lock nut 31 then is tightened to prevent further movement of the penetrator.

Any suitable method of determining the proper adjustment of the penetrator 29 relative to the plug 26 may be employed, but it has been found that the most accurate method is to utilize the electrical circuit illustrated in Fig. 1. This circuit consists of any source of electric current, such as a dry cell battery C, having one of its terminals connected to a lamp L, or other visible or audible signaling device, by the wire 32. The second terminal of the lamp L is connected to a lead wire 33 and the battery C has a lead wire 34 connected to its other terminal. Contact is manually, or otherwise suitably, established between the lead wires 33 and 34 and the lug 28 and plug 26. Adjustment of the pentrator 31 into mere point contact with the plug 26 will, therefore, close the circuit through the lamp L for energizing the same. This adjustment of the penetrator 31 is made while the chain is unloaded and not in motion. The electrical circuit thereafter is broken by disconnecting the lead wires 33 and 34 and the chain is operated under its intended normal load and speed conditions for a short period of time.

During this operation of the chain 9, the tension in the chain will effect an elongation of the special side plates 16 which will be directly proportional to the tensile load on the chain. The elongation of the side plates 16, also, will be proportional to the elongation of the standard side plates 9 and 13 of pitches A and B but will be greatly exaggerated due to the use of material having a low modulus of elasticity in constructing the plates 16. This elongation of the plates 16 will cause the overlapped free end portions of the blocks 19 and 22 to be moved in opposite directions or, more specifically, so there will occur a change in the overall length of the two blocks. The penetrator 29, therefore, is moved toward the plug 26 so that the point of the penetrator will enter the plug a distance which will be equal to the elongation of the special side plates 16. The indentation thus formed in the plug 26 is permanent and will provide a measurable recording of the maximum depth of penetration.

In actual practice, the tensiometer assembly is calibrated by applying a series of different known loads to a static chain and measuring the depth of penetration for each load. From this data a curve may be established which will indicate the load applied to a chain for any given depth of penetration falling within the range that is covered by the curve. Measurement of the depth of penetration produced under any given operating condition will, by referring to the curve described above, disclose the actual maximum load to which the chain has been subjected during such operation. The Bakelite block 25 is replaceable and a number of tests can be run by substituting a new block, with its lead insert, at the beginning of each test. The plug 26 being of soft metal and having a relatively low melting point may be replaced in the field and the Bakelite blocks 25 thereby reconditioned for repeated use.

Referring now to Figs. 4 to 6, inclusive, wherein is illustrated a modified form of the invention, it will be apparent that the elements illustrated are identical to those of Figs. 1 to 3, inclusive, with the single exception of the special side plates 35. The same reference characters have, therefore, been used to designate identical parts.

It has been previously pointed out that the cross-sectional area of the special side plates and the material from which they are made may be varied to produce the desired elongation under a given loading condition. The side plates 35, illustrated in Figs. 4 to 6, inclusive, are so formed as to vary the elongation per unit load in a different manner to that obtained with the special side plates of Figs. 1 to 3, inclusive. These side plates 35 are shaped as parts of rings or annular members and are cut away approximately along the plane of the contact face of the chain 8. The side plates 35, therefore, will not interfere with the proper engagement of the chain with the sprockets and will provide a greater degree of elongation per unit load.

The side plates 35 are particularly adapted for use in testing chains which are subjected to relatively light loads and have very little clearance between the contact face of the chain 8 and the sprockets. The special side plates may be constructed of steel but for extra sensitivity and lighter load applications aluminum will provide a more satisfactory test.

Fig. 7 illustrates a still further modification of the invention in which the special side plates 36 are fully circular or annular. The general characteristics of the circular side plates 36 are similar to those of the side plates 35 but a lesser degree of elongation per unit load will be obtained. These circular side plates, therefore, are particularly adapted for testing chains which are subjected to a relatively heavy load and which operate with a sufficient clearance to allow the circular side plates to pass the sprockets.

In each of the modifications illustrated in Figs. 4 to 6, inclusive, and 7, the operation of the test device, and the results which it produces, are identical to those of the modification illustrated in Figs. 1 to 3, inclusive. Their mode of operation, therefore, need not be described.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. A device for use in determining the maximum loading of an operating chain, comprising a link which will elongate during operation of the chain and having pins for connecting the elongative link into the chain to be tested, a pointed penetrator member, means for connecting the penetrator member to a portion of the elongative link to move with said portion during elongation of the link, a penetrable member, and means for connecting the penetrable member to a portion of the elongative link that is spaced longitudinally of the portion to which the penetrator member is connected, said connecting means for the penetrator and penetrable members having portions overlapped for supporting said members in opposed relationship so they will move toward each other during elongation of the elongative link to cause the point of the penetrator member to enter the penetrable member a measurable distance.

2. A device for use in determining the maximum loading of an operating chain, comprising a link which will elongate during operation of the chain and having pins for connecting the elongative link into the chain to be tested, a pointed penetrator member, connecting means rigidly mounted on a portion of the elongative link for movement with said portion during elongation of the link, means for adjustably mounting said penetrator member on said connecting means for longitudinal adjustment relative to the latter, a penetrable member, and means for connecting the penetrable member to a portion of the elongative link that is spaced longitudinally of the portion on which the first mentioned connecting means is mounted, said connecting means for the penetrable member and said adjustable mounting means having longitudinally overlapped portions for supporting said members in longitudinally reversed relationship relative to their respective points of connection with the elongative link so they will move toward each other during elongation of the elongative link to cause the point of the penetrator member to enter the penetrable member a measurable distance.

3. A device for use in determining the maximum loading of an operating chain, comprising a link which will elongate during operation of the chain and having pins for connecting the elongative link into the chain to be tested, a pointed penetrator member, a first connecting means rigidly mounted on a portion of the elongative link for movement with said portion during elongation of the link, means for adjustably mounting said penetrator member on said connecting means for longitudinal adjustment relative to the latter, a penetrable member, and a second connecting means rigidly mounted on a portion of the elongative link that is spaced longitudinally of the portion on which the first connecting means is mounted, said first and second connecting means having portions overlapped for supporting said penetrable member in opposed relationship to the pointed penetrator member so said penetrator and penetrable members will move toward each other during elongation of the elongative link to cause the point of the penetrator member to enter the penetrable member a measurable distance.

4. A device for use in determining the maximum loading of an operating chain, comprising a link which will elongate during operation of the chain and having pins for connecting the elongative link into the chain to be tested, a pointed penetrator member, a block having one of its end portions rigidly connected to a portion of the elongative link to move with said portion during elongation of the link, a lug threadedly connecting said penetrator member to said block for longitudinal adjustment of the penetrator member relative to the block, a penetrable member, and a second block having one of its end portions rigidly mounted on a portion of the elongative link that is spaced longitudinally of that portion to which the first block is connected, said second block having a pair of spaced arms at its free end portion for receiving therebetween the free end portion of said first block and for supporting said penetrable member in opposed relationship to said penetrator member so the members will move toward each other during elongation of the elongative link to cause the point of the penetrator member to enter the penetrable member a measurable distance.

5. A device for use in determining the maximum loading of an operating chain, comprising a link which will elongate during the operation of the chain and having pins for connecting the elongative link into the chain to be tested, a block having one of its end portions rigidly connected to a portion of the elongative link for movement with the latter during elongation of the link, a pointed penetrator member adjustably mounted on the free end portion of said block for longitudinal adjustment relative to the block, a second block having one of its end portions rigidly connected to a portion of the elongative link that is spaced longitudinally of that portion of the elongative link to which the first block is connected, said first and second blocks having their free end portions arranged in a longitudinally overlapped relationship, and a penetrable member mounted on the free end portion of said second block and having one face opposed to said pointed penetrator member so that elongation of the elongative link will effect relative movement between the penetrator and penetrable members mounted on said blocks to cause the point of the penetrator member to enter the penetrable member a measurable distance.

6. A device for use in determining the maximum loading of an operating chain, comprising a link which will elongate during operation of the chain and having pins for connecting the elongative link into the chain to be tested, a pointed penetrator member, connecting means rigidly mounted on a portion of the elongative link for movement with said portion during elongation of the link, means for adjustably mounting said penetrator member on said connecting means for longitudinal adjustment relative to the latter, a penetrable member, means for connecting the penetrable member to a portion of the elongative link that is spaced longitudinally of the portion on which the connecting means is mounted, an open electrical circuit including a source of energy and signal means, means for temporarily connecting the ends of said circuit to the penetrator and penetrable members so that said circuit will be closed to actuate said signal means by the adjustment of said penetrator member into point contact with said penetrable member after which the circuit ends are disconnected, said connecting means for the penetrable member having portions arranged in longitudinally overlapped relationship with said mounting means for the penetrator member to support said members for movement toward each other during elongation of the elongative link to cause the point of the penetrator member to enter the penetrable member a measurable distance.

7. A device for use in determining the maximum loading of an operating chain, comprising a link having side plates which will elongate during operation of the chain and having pins for connecting the link side plates into the chain to be tested, a pointed penetrator member, means for connecting the penetrator member to a portion of one of the elongative link side plates to move with said portion during elongation of said side plate, a penetrable member, and means for connecting the penetrable member to a portion of the same elongative side plate that is spaced longitudinally of the portion to which the penetrator member is connected, said connecting means for the penetrator and penetrable members having overlapped portions for supporting said members so they will move toward each other during elongation of said elongative side plate to cause the point of the penetrator member to enter the penetrable member a measurable distance.

8. A device for use in determining the maximum loading of an operating chain, comprising a link having side plates which will elongate during operation of the chain and having pins for connecting the corresponding end portions of said side plates into the chain to be tested, a pointed penetrator member, a first connecting means rigidly mounted on a portion of one of the elongative link side plates for movement with said portion during elongation of said side plate, means for adjustably mounting said penetrator member on said connecting means for longitudinal adjustment relative to the latter, a penetrable member, and a second connecting means rigidly mounted on a portion of the same elongative side plate that is spaced longitudinally of the portion to which the first connecting means is connected, said second connecting means having portions arranged in overlapped relationship with said first connecting means for supporting said penetrable member in opposed relationship to the pointed penetrator member so said members will move toward each other during elongation of the elongative side plate to cause the point of the penetrator member to enter the penetrable member a measurable distance.

9. A device for use in determining the maximum loading of an operating chain, comprising a link having side plates which will elongate during the operation of the chain and having pins for connecting the elongative link side plates into the chain to be tested, a first block rigidly connected to one of said pins for movement with its pin during elongation of the link side plates, a pointed penetrator member adjustably mounted on said block for longitudinal adjustment relative to the block, a second block rigidly connected to the other of said pins for movement with its pin during elongation of the link side plates and extending into overlapped relationship with a portion of said first block, and a penetrable member mounted on said second block and having one face opposed to said pointed penetrator member so that elongation of the elongative link side plates will effect relative movement between said blocks and the penetrator and penetrable members mounted thereon to cause the point of the penetrator member to enter the penetrable member a measurable distance.

10. A device for use in determining the maximum loading of the links of an operating chain, comprising pins connecting the links at two adjacent joints of the chain, a penetrator member, means for connecting said penetrator member to one of said joint pins for movement therewith, a penetrable member, and means for connecting said penetrable member to the other of said joint pins for movement therewith, said connecting means for the penetrator and penetrable members having overlapped portions for supporting the penetrable member in opposed relationship to the penetrator member so that relative movement of said pins away from each other will cause the penetrator member to enter the penetrable member a measurable distance.

11. A device for use in determining the maximum loading of an operating chain, comprising a link, having side plates of greater elasticity than the remainder of the chain, connected in the chain to be tested, a first member connected to a portion of one of said side plates for movement therewith, a second member connected to a portion of said one side plate that is spaced longitudinally of the first mentioned portion so that said first and second members will move relative to each other during elongation of the side plate, and means associated with said first and second members for operation in response to relative movement of the members away from each other to permanently record the maximum extent of such movement.

12. A device for use in determining the maximum loading of the links of an operating chain, comprising pins for connecting one of the links to the two adjacent links of the chain, a first member mounted on one end of one of said pins for movement therewith, a second member mounted on the corresponding end of the other of said pins so that said first and second members will move relative to each other when the distance between said pins is varied, and means associated with said first and second members for operation in response to relative movement therebetween to permanently record the maximum increase in the distance between said pins.

CARL F. LAUENSTEIN.
IVAN E. RHODEN.

REFERENCES CITED

The following references are of record in the file of this patent:

UNITED STATES PATENTS

| Number | Name | Date |
|---|---|---|
| 28,743 | Duff et al. | June 19, 1860 |
| 2,091,535 | Templin et al. | Aug. 31, 1937 |
| 2,195,451 | Edwards | Apr. 2, 1940 |
| 2,385,052 | Birk et al. | Sept. 18, 1945 |
| 2,464,152 | Ralston | Mar. 8, 1949 |